US012423998B2

(12) United States Patent
Mitsumori et al.

(10) Patent No.: US 12,423,998 B2
(45) Date of Patent: Sep. 23, 2025

(54) APPARATUS, METHOD, AND COMPUTER PROGRAM FOR DETERMINING DRIVER'S BEHAVIOR

(71) Applicants: TOYOTA JIDOSHA KABUSHIKI KAISHA, Toyota (JP); AISIN CORPORATION, Aichi-ken (JP)

(72) Inventors: Taku Mitsumori, Kariya (JP); Yuki Horiuchi, Tokyo-to (JP); Masahiro Ishihara, Tokyo-to (JP); Yuji Yamanishi, Tokyo-to (JP); Yuki Takeda, Kariya (JP)

(73) Assignees: TOYOTA JIDOSHA KABUSHIKI KAISHA, Toyota (JP); AISIN CORPORATION, Aichi-Ken (JP)

( * ) Notice: Subject to any disclaimer, the term of this patent is extended or adjusted under 35 U.S.C. 154(b) by 376 days.

(21) Appl. No.: 18/145,966

(22) Filed: Dec. 23, 2022

(65) Prior Publication Data
US 2023/0206658 A1    Jun. 29, 2023

(30) Foreign Application Priority Data
Dec. 27, 2021  (JP) .............................. 2021-213389

(51) Int. Cl.
*G06V 20/59* (2022.01)
*G06T 7/70* (2017.01)

(52) U.S. Cl.
CPC .............. *G06V 20/597* (2022.01); *G06T 7/70* (2017.01); *G06T 2207/30196* (2013.01); *G06T 2207/30268* (2013.01)

(58) Field of Classification Search
CPC .................. G06V 20/597; G06T 7/70; G06T 2207/30196; G06T 2207/30268
See application file for complete search history.

(56) References Cited

U.S. PATENT DOCUMENTS

| 10,836,309 B1 * | 11/2020 | Trundle ............... G08G 1/0116 |
| 2017/0043715 A1 * | 2/2017 | Osugi ..................... B60Q 9/00 |
| 2018/0124233 A1 * | 5/2018 | Abramson ............ H04W 12/30 |

(Continued)

FOREIGN PATENT DOCUMENTS

| JP | 2016006628 A | 1/2016 |
| JP | 2018166268 A | 10/2018 |

(Continued)

OTHER PUBLICATIONS

Vicente et al. "Driver Gaze Tracking and Eyes Off the Road Detection System," in IEEE Transactions on Intelligent Transportation Systems, Aug. 2015.*

*Primary Examiner* — Shaghayegh Azima
(74) *Attorney, Agent, or Firm* — Dickinson Wright, PLLC

(57) ABSTRACT

An apparatus for determining a driver's behavior includes a processor configured to detect a looking direction of a driver of a vehicle, based on an image obtained by a camera provided to capture the interior of the vehicle, calculate an angle formed between the looking direction and a normal direction of an operation screen of a portable device in the vehicle, the normal direction being indicated by information received from the portable device via a communication device capable of communicating with the portable device, and determine that the driver is operating the portable device when the angle is within a predetermined angle range.

5 Claims, 5 Drawing Sheets

(56) References Cited

U.S. PATENT DOCUMENTS

| | | | |
|---|---|---|---|
| 2021/0142055 A1* | 5/2021 | Broggi | G08B 13/19656 |
| 2023/0206658 A1* | 6/2023 | Mitsumori | G06V 20/597 |
| | | | 382/103 |

FOREIGN PATENT DOCUMENTS

| | | | |
|---|---|---|---|
| JP | 2019074944 A | | 5/2019 |
| JP | 2020166309 A | * | 10/2020 |

* cited by examiner

APPARATUS, METHOD, AND COMPUTER PROGRAM FOR DETERMINING DRIVER'S BEHAVIOR

FIELD

The present invention relates to an apparatus, a method, and a computer program for determining predetermined behavior of a vehicle driver.

BACKGROUND

Techniques for detecting inappropriate behavior of a vehicle driver driving a vehicle by monitoring the driver have been researched. In particular, techniques for detecting operation of a portable device by a driver during driving the vehicle have been proposed (see Japanese Unexamined Patent Publications JP2016-6628A, JP2018-166268A, and JP2019-74944A) because it is very dangerous for a driver to become distracted from the surroundings of the vehicle by operating a portable device during driving.

In the technique disclosed in JP2016-6628A, whether a driver is watching a display of a mobile terminal is determined on the basis of image data captured by a camera included in the mobile terminal. In the technique disclosed in JP2018-166268A, whether a user of a portable device is a driver is determined by analyzing images captured by a camera provided for the portable device.

In the technique disclosed in JP2019-74944A, whether a driver is driving while operating a smartphone is determined by image analysis of images captured by a driver capturing camera.

SUMMARY

The techniques disclosed in JP2016-6628A and JP2018-166268A require a portable device to constantly capture images of a driver, increasing power consumption of the portable device. In the technique disclosed in JP2019-74944A, whether a driver is operating a portable device cannot be determined unless the portable device is represented in images captured by a vehicle-mounted camera. However, the area to be captured by a vehicle-mounted camera is limited, or may include a blind spot made by, for example, a steering wheel, depending on the mounted position of the camera. For this reason, images generated by the camera may not represent a portable device in some cases.

It is an object of the present invention to provide an apparatus for determining a driver's behavior that can determine whether a driver is operating a portable device even if the portable device is not represented in images of the interior of a vehicle.

According to an embodiment, an apparatus for determining a driver's behavior is provided. The apparatus includes a processor configured to: detect a looking direction of a driver of a vehicle, based on an image obtained by a camera provided to capture the interior of the vehicle, calculate an angle formed between the looking direction and a normal direction of an operation screen of a portable device in the vehicle, the normal direction being indicated by information received from the portable device via a communication device capable of communicating with the portable device, and determine that the driver is operating the portable device when the angle is within a predetermined angle range.

The processor is preferably further configured to detect a lengthwise direction of one of the driver's arms, based on the image. In this case, the processor preferably determines that the driver is operating the portable device only when the position at which the lengthwise direction and the looking direction cross is inside a space in the interior of the vehicle where the portable device is operable.

The processor preferably does not determine that the driver is operating the portable device when the looking direction is within a predetermined front area centered in a travel direction of the vehicle.

According to another embodiment, a method for determining a driver's behavior is provided. The method includes: receiving information indicating a normal direction of an operation screen of a portable device in a vehicle from the portable device via a communication device capable of communicating with the portable device; detecting a looking direction of a driver of the vehicle, based on an image obtained by a camera provided to capture the interior of the vehicle; calculating an angle formed between the looking direction and the normal direction of the operation screen of the portable device; and determining that the driver is operating the portable device when the angle is within a predetermined angle range.

According to still another embodiment, a non-transitory recording medium that stores a computer program for determining a driver's behavior is provided. The computer program includes instructions causing a processor mounted on a vehicle to execute a process including: receiving information indicating a normal direction of an operation screen of a portable device in the vehicle from the portable device via a communication device capable of communicating with the portable device; detecting a looking direction of a driver of the vehicle, based on an image obtained by a camera provided to capture the interior of the vehicle; calculating an angle formed between the looking direction and the normal direction of the operation screen of the portable device; and determining that the driver is operating the portable device when the angle is within a predetermined angle range.

The apparatus according to the present disclosure has an advantageous effect of being able to determine whether a driver is operating a portable device even if the portable device is not represented in images of the interior of a vehicle.

DESCRIPTION OF EMBODIMENTS

An apparatus for determining a driver's behavior as well as a method and a computer program therefor executed by the apparatus will now be described with reference to the attached drawings. The inventor has focused on the fact that while operating a portable device, such as a smartphone or a tablet, a driver generally looks at its operation screen and thus holds the portable device so as to face the operation screen. Thus the apparatus receives information indicating the normal direction of an operation screen from a portable device, and determines whether an angle formed between a driver's looking direction and the normal direction of the operation screen of the portable device is within a predetermined angle range. When the angle is within the predetermined angle range, the apparatus determines that the driver is operating the portable device. In this way, the apparatus can determine whether a driver is operating a portable device even if the portable device is not represented in images generated by a camera provided in the interior of a vehicle.

Figure 1:
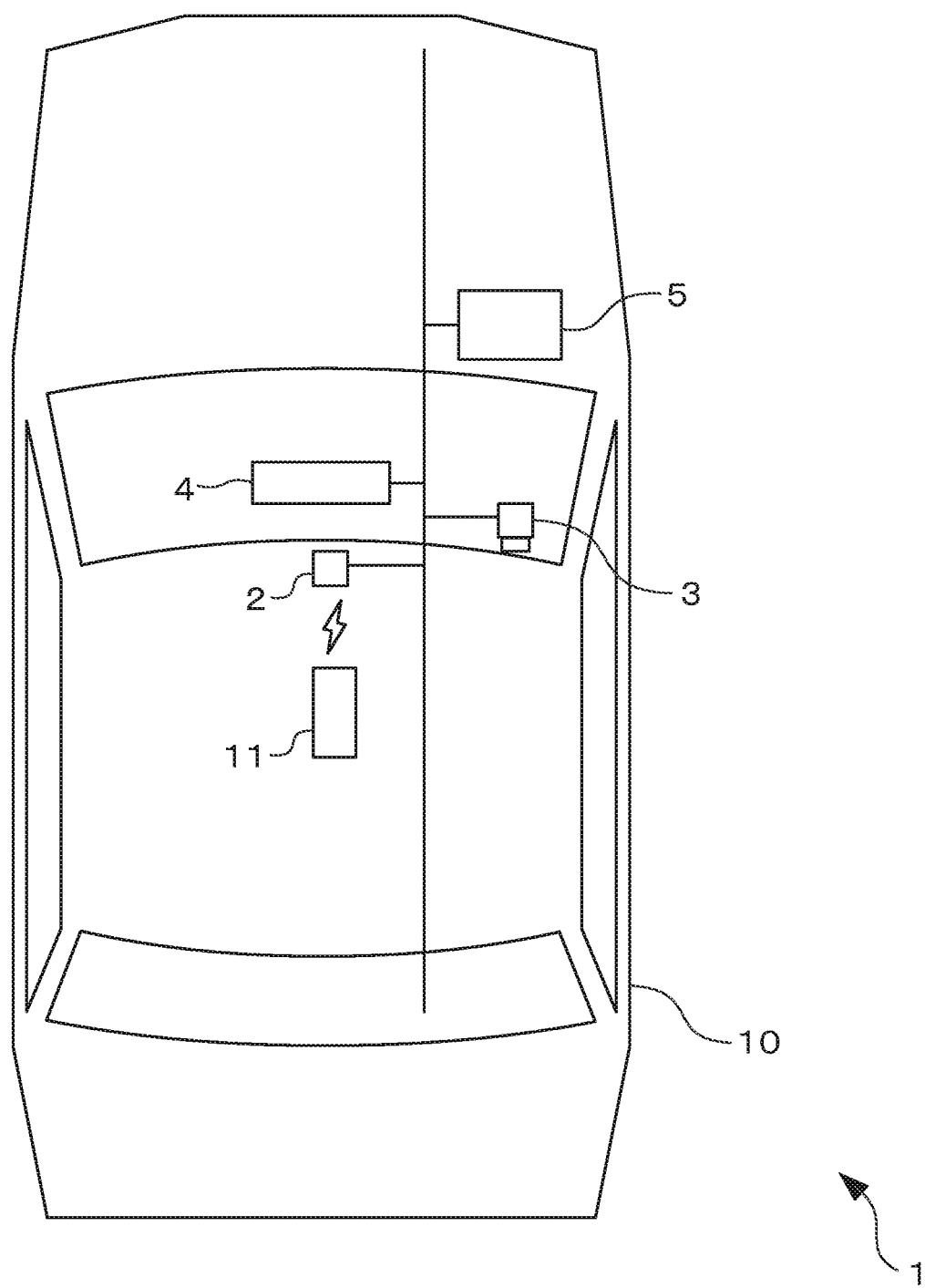
FIG. 1 schematically illustrates the configuration of a driver assistance system including an apparatus for determining a driver's behavior.

FIG. 1 schematically illustrates the configuration of a driver assistance system including the apparatus for determining a driver's behavior. The driver assistance system 1, which is mounted on a vehicle 10, includes a communication device 2 capable of communicating with a portable device 11 located in the interior of the vehicle 10, a driver monitoring camera 3, a notification device 4, and an electronic control unit (ECU) 5, which is an example of the apparatus for determining a driver's behavior. The communication device 2, the driver monitoring camera 3, and the notification device 4 are connected to the ECU 5 via an in-vehicle network conforming to a communication standard, such as a controller area network, so that they can communicate with each other.

The portable device 11 is a device that can be carried by a driver, e.g., a portable phone, such as a smartphone, or a tablet. The portable device 11 is provided with an operation screen, for example, made of a touch screen, and executes a predetermined operation in response to the driver's touch on the operation screen to operate the portable device 11. The portable device 11 further includes a built-in sensor for measuring the normal direction of the operation screen, such as a gyro sensor, and measures the normal direction of the operation screen with this sensor at predetermined intervals.

The portable device 11 further includes a communication device for transmitting or receiving wireless signals conforming to a predetermined near-field communication standard, and is configured to be communicable, via this communication device, with the communication device 2. The predetermined near-field communication standard may be, for example, Bluetooth (registered trademark). At predetermined intervals or whenever the normal direction of the operation screen changes by a predetermined angle or more, the portable device 11 generates a wireless signal including information indicating the normal direction of the operation screen, and transmits the wireless signal via its communication device to the communication device 2. The portable device 11 may include a communication interface for being wired to the communication device 2, e.g., one conforming to a bus standard, such as universal serial bus (USB). In this case, the portable device 11 may transmit the information indicating the normal direction of the operation screen to the communication device 2 by wire.

The communication device 2, which is an example of the communication unit, communicates with the portable device 11. To achieve this, the communication device 2 is configured to transmit or receive, for example, wireless signals conforming to the predetermined near-field communication standard. In the case that the communication device 2 and the portable device 11 are wired, the communication device 2 may include a communication interface and a communication circuit conforming to a bus standard, such as universal serial bus (USB). Whenever information indicating the normal direction of the operation screen of the portable device 11 is received from the portable device 11, the communication device 2 passes the received information to the ECU 5.

The driver monitoring camera 3, which is an example of an image capturing unit, includes a two-dimensional detector constructed from an array of optoelectronic transducers, such as CCD or C-MOS, having sensitivity to visible or infrared light and a focusing optical system that forms an image of a target region on the two-dimensional detector. The driver monitoring camera 3 may further include a light source, such as an infrared LED, for illuminating the driver. The driver monitoring camera 3 is mounted, for example, on or near an instrument panel and oriented to the driver so that the head of the driver sitting on the driver's seat of the vehicle 10 may be included in the target region of capturing, i.e., so that images of the driver's head can be captured. The driver monitoring camera 3 takes pictures of the driver every predetermined capturing period (e.g., $\frac{1}{30}$ to $\frac{1}{10}$ seconds) and generates images representing the driver (hereafter, "driver images"). The driver images obtained by the driver monitoring camera 3 may be color or grayscale images. Whenever a driver image is generated, the driver monitoring camera 3 outputs the driver image to the ECU 5 via the in-vehicle network.

The notification device 4 is provided in the interior of the vehicle 10, and makes a predetermined notification to the driver by light, voice, or display of characters or an image. To achieve this, the notification device 4 includes, for example, at least a speaker, a light source, or a display. Upon receiving a notification indicating a warning to the driver from the ECU 5, the notification device 4 notifies the driver of the warning by a voice from the speaker, lighting or blinking of the light source, or display of a warning message on the display.

The ECU 5 determines the driver's behavior. In the present embodiment, the ECU 5 determines whether the driver is operating the portable device 11; and when it is determined that the driver is operating the portable device 11, the ECU 5 warns the driver or controls the vehicle 10 so that the vehicle 10 makes an emergency stop.

Figure 2:
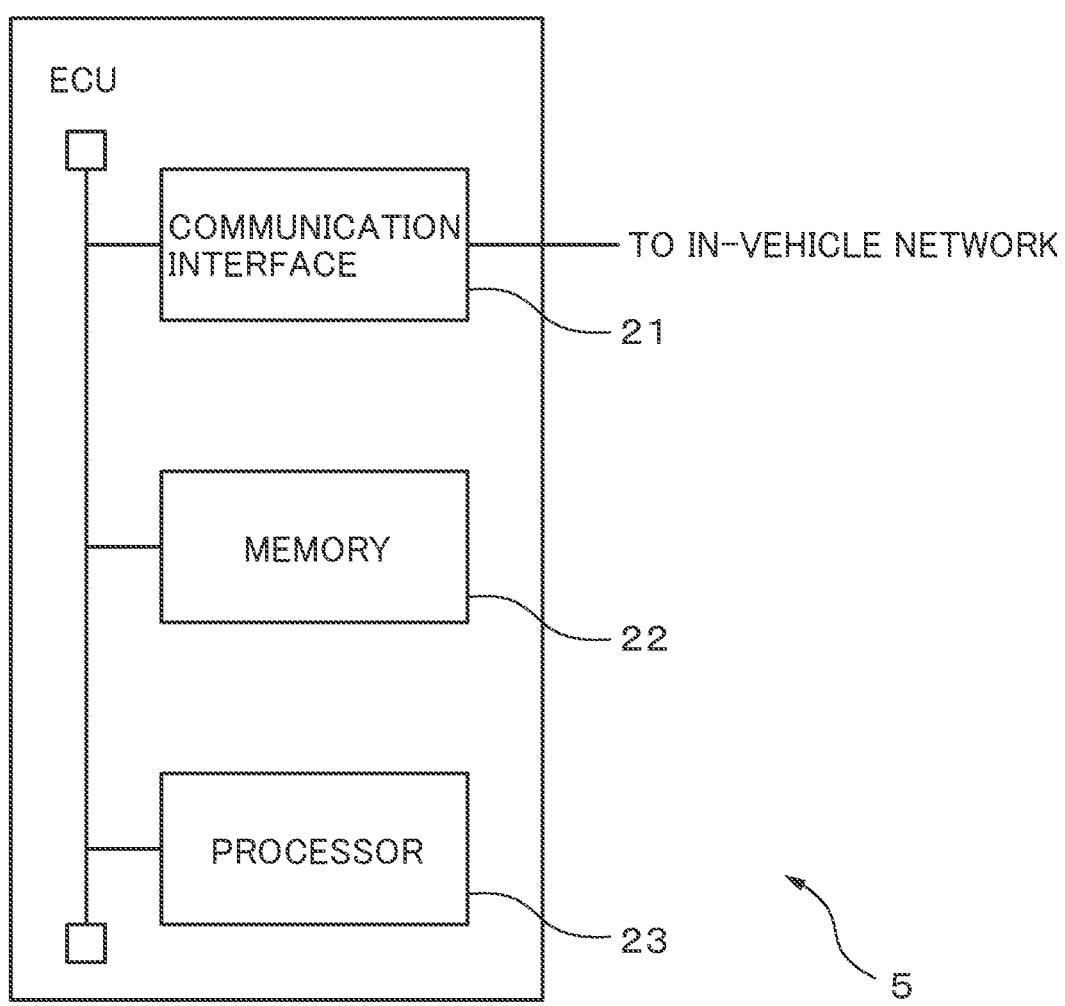
FIG. 2 illustrates the hardware configuration of an ECU, which is an example of the apparatus for determining a driver's behavior.

FIG. 2 illustrates the hardware configuration of the ECU 5. As illustrated in FIG. 2, the ECU 5 includes a communication interface 21, a memory 22, and a processor 23. The communication interface 21, the memory 22, and the processor 23 may be configured as separate circuits or a single integrated circuit.

The communication interface 21 includes an interface circuit for connecting the ECU 5 to the in-vehicle network. Whenever information indicating the normal direction of the operation screen of the portable device 11 is received from the communication device 2, the communication interface 21 passes this information to the processor 23. Whenever a driver image is received from the driver monitoring camera 3, the communication interface 21 passes the driver image to the processor 23. Additionally, upon receiving information to be notified to the driver with the notification device 4, such as a notification indicating a warning from the processor 23 to the driver, the communication interface 21 outputs this information to the notification device 4.

The memory 22, which is an example of a storage unit, includes, for example, volatile and nonvolatile semiconductor memories, and stores various algorithms and various types of data used in a driver's behavior determination process executed by the processor 23 of the ECU 5. For example, the memory 22 stores various parameters used for detecting a looking direction and determining whether the driver is operating a portable device. Additionally, the memory 22 temporarily stores driver images and various types of data generated during the driver's behavior determination process.

The processor 23 includes one or more central processing units (CPUs) and a peripheral circuit thereof. The processor 23 may further include another operating circuit, such as a logic-arithmetic unit, an arithmetic unit, or a graphics processing unit. The processor 23 executes the driver's behavior determination process.

Figure 3:
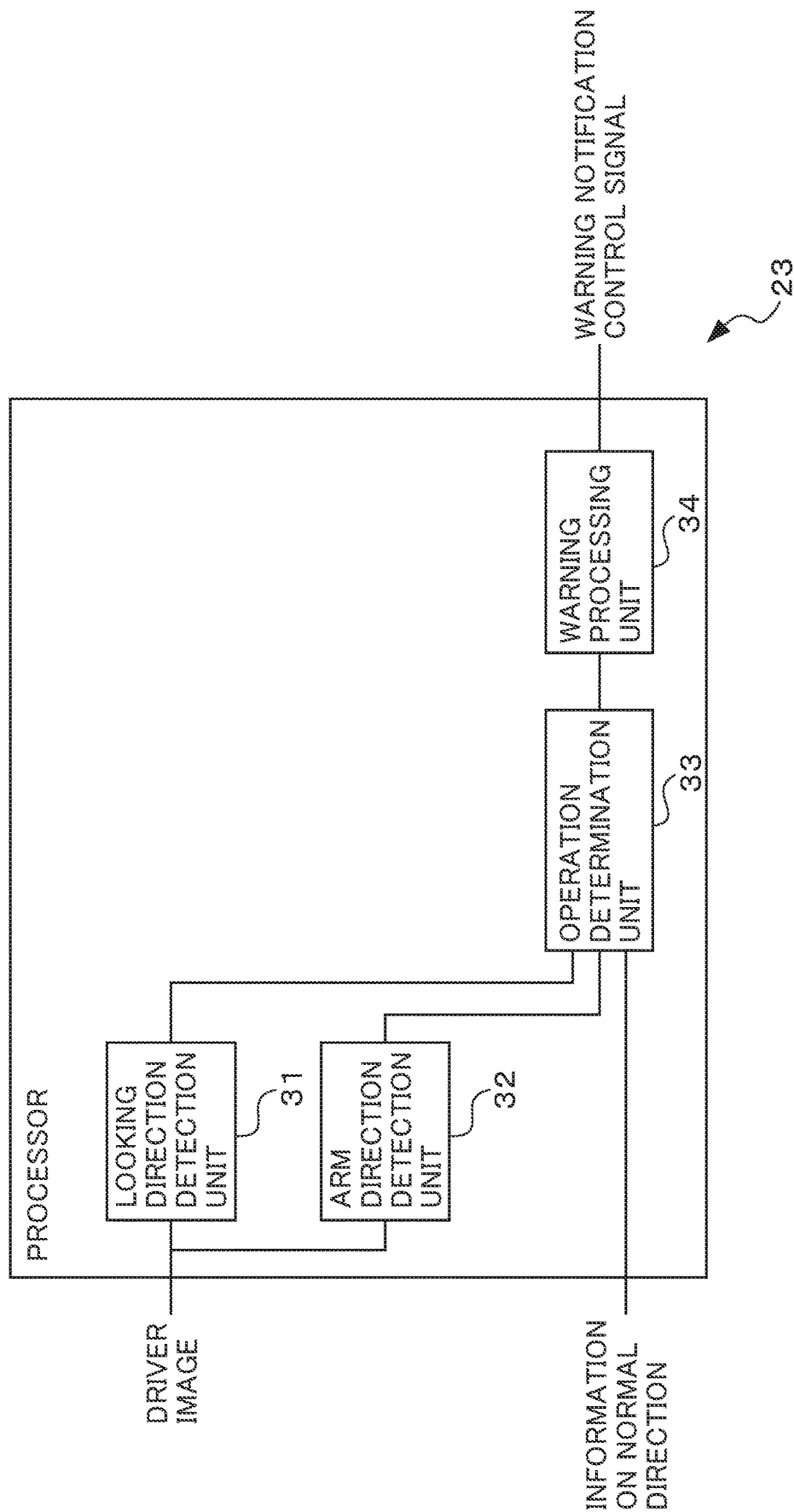
FIG. 3 is a functional block diagram of a processor of the ECU, related to a driver's behavior determination process.

FIG. 3 is a functional block diagram of the processor 23, related to the driver's behavior determination process. The processor 23 includes a looking direction detection unit 31, an arm direction detection unit 32, an operation determination unit 33, and a warning processing unit 34. These units included in the processor 23 are functional modules, for example, implemented by a computer program executed by the processor 23, or may be dedicated operating circuits provided in the processor 23.

Whenever the processor 23 receives a driver image, the looking direction detection unit 31 detects the driver's looking direction, based on the driver image. To achieve this, the looking direction detection unit 31 detects a region representing the driver's face in the driver image (hereafter, a "face region"), for example, by inputting the driver image into a classifier that has been trained to detect a driver's face from an image. As such a classifier, the looking direction detection unit 31 may use, for example, a deep neural network (DNN) having a convolutional neural network (CNN) architecture or an AdaBoost classifier.

Additionally, the looking direction detection unit 31 detects an area representing the driver's eye (hereafter, an "eye area") from the face region in the driver image. To this end, the looking direction detection unit 31 applies, for example, an edge detection filter, such as a Sobel filter, to detect edge pixels in the face region. The looking direction detection unit 31 then detects lines of edge pixels extending in a substantially horizontal direction, and detects, for each of the left and right eyes, such two lines vertically spaced in an area of the face region where the eye is supposed to lie, as the upper and lower eyelids of the eye. The looking direction detection unit 31 may detect the upper and lower eyelids of the driver's left and right eyes from the driver image in accordance with another technique to detect upper and lower eyelids from an image. Upon detection of the upper and lower eyelids of the driver's left and right eyes from the driver image, the looking direction detection unit 31 detects an area defined by the upper and lower eyelids as an eye area for at least one of the driver's left and right eyes.

Upon detection of an eye area, the looking direction detection unit 31 detects a corneal reflection image of a light source, or a Purkinje image, and the centroid of the pupil (hereafter simply the "pupillary centroid") from the eye area. Specifically, the looking direction detection unit 31 detects a Purkinje image, for example, by template matching of the eye area with templates of a Purkinje image. Similarly, the looking direction detection unit 31 detects the pupil by template matching of the eye area with templates of a pupil, and determines the centroid of the area representing the detected pupil as the pupillary centroid. The looking direction detection unit 31 may detect a Purkinje image and the pupillary centroid in accordance with another technique to detect them from an eye area. The looking direction detection unit 31 then calculates the distance between the Purkinje image and the pupillary centroid, and refers to a table representing the relationship between this distance and a driver's looking direction to detect the driver's looking direction. Such a table may be prestored in the memory 22. When the looking directions of both of the left and right eyes are detected, the looking direction detection unit 31 determines the average of the looking directions of the left and right eyes as the driver's looking direction. Additionally, the looking direction detection unit 31 estimates the real-space positions of the driver's eyes, based on the directions from the driver monitoring camera 3 to the positions of the driver's eyes and the distances from the driver monitoring camera 3 to the driver's eyes. The looking direction detection unit 31 determines the directions from the driver monitoring camera 3 to the positions of the eyes, from the positions of the eyes in the driver image. The looking direction detection unit 31 estimates the distances from the driver monitoring camera 3 to the driver's eyes, from information indicating the position of the driver's seat obtained from the driver's seat.

Whenever the driver's looking direction is detected, the looking direction detection unit 31 notifies the operation determination unit 33 of the detected looking direction and the positions of the driver's eyes.

Whenever the processor 23 receives a driver image, the arm direction detection unit 32 detects the lengthwise direction of the driver's arm, based on the driver image. The lengthwise direction of the arm as used herein refers to that of an end portion from an elbow, i.e., a forearm. For example, the arm direction detection unit 32 can estimate the real-space lengthwise direction of the arm by detecting the driver's posture represented in the driver image in accordance with a technique for detecting a human posture represented in an image, such as OpenPose. Additionally, the arm direction detection unit 32 can determine the direction from the driver monitoring camera 3 to the elbow, based on the position of the elbow in the driver image. Additionally, the arm direction detection unit 32 can estimate the distance from the driver monitoring camera 3 to the elbow, based on the distance from the driver monitoring camera 3 to the driver's seat, an estimated length of the driver's upper arm, and the lengthwise direction of the upper arm estimated from the driver's posture. The distance from the driver monitoring camera 3 to the driver's seat is estimated on the basis of the position of the driver's seat, as described above. The estimated length of the driver's upper arm may be prestored in the memory 22. The arm direction detection unit 32 can calculate a straight line indicating the real-space lengthwise direction of the driver's arm, based on the lengthwise direction of the driver's forearm, the estimated distance from the driver monitoring camera 3 to the driver's elbow, and the direction from the driver monitoring camera 3 to the elbow.

Whenever the lengthwise directions of the driver's left and right arms are detected, the arm direction detection unit 32 notifies the operation determination unit 33 of the detected straight lines indicating the lengthwise directions of the arms. When the lengthwise direction of one of the driver's left and right arms cannot be detected, for example, because of lack of most of a hand and an arm in the driver image, the arm direction detection unit 32 notifies the operation determination unit 33 of the straight line indicating the detected lengthwise direction.

The operation determination unit 33 determines whether the driver is operating the portable device 11, based on the driver's looking direction, the positions of the eyes, the normal direction of the operation screen of the portable device 11, the straight line indicating the lengthwise direction of the driver's arm.

Figure 4:
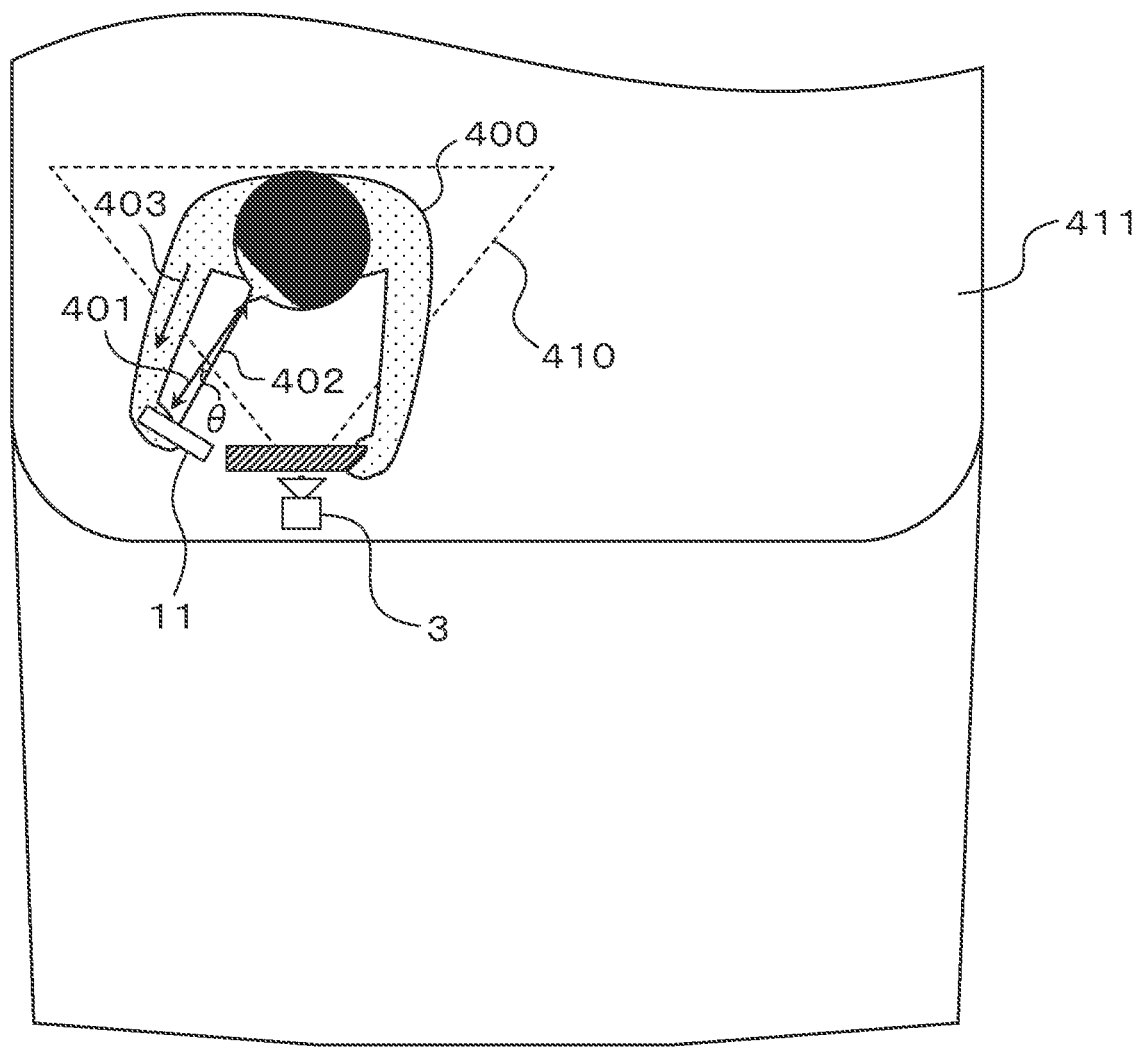
FIG. 4 illustrates an example of the relationship between a driver's looking direction, the normal direction of an operation screen of a portable device, and the lengthwise direction of the driver's arm for the case that the driver is operating the portable device.

FIG. 4 illustrates an example of the relationship between the driver's looking direction, the normal direction of the operation screen of the portable device 11, and the lengthwise direction of the driver's arm for the case that the driver is operating the portable device 11.

In general, when operating the portable device 11, a driver 400 is looking at the operation screen of the portable device 11, as described above. For this reason, the operation screen of the portable device 11 faces the driver 400, and thus an angle θ formed between the looking direction 401 of the driver 400 and the normal direction 402 of the operation screen of the portable device 11 falls within a certain angle range. However, the portable device 11 may be outside the area 410 to be captured by the driver monitoring camera 3.

When the driver 400 is operating the portable device 11, the portable device 11 is supposed to be ahead in the lengthwise direction 403 of the arm of the driver 400. Additionally, the portable device 11 is supposed to be in a space 411 in the vehicle interior where the driver 400 can operate the portable device 11 (hereafter simply, an "operable space"). In other words, the portable device 11 cannot be outside the vehicle interior or at a place in the vehicle interior where another device such as a steering wheel exists.

In view of this, the operation determination unit 33 calculates an angle formed between the driver's looking direction and the normal direction of the operation screen of the portable device 11, and determines whether the angle is within a predetermined angle range (e.g., not greater than 5, 10, or 20 degrees). Additionally, the operation determination unit 33 calculates the positions at which the driver's looking direction and the lengthwise directions of the driver's left and right arms cross (hereafter simply the "crossing positions"), based on the positions of the driver's eyes, his/her looking direction, and the straight lines indicating the lengthwise directions of his/her left and right arms. Specifically, when the shortest distance between two points on the straight lines indicating the looking direction and the lengthwise direction of an arm is not greater than a predetermined distance threshold, the operation determination unit 33 determines that the looking direction and the lengthwise direction of the arm cross, and determines the position of the point on the straight line indicating the lengthwise direction of the arm for the case that the distance between these points is the shortest, as the crossing position. When the shortest distance between two points on the straight lines indicating the looking direction and the lengthwise direction of an arm is greater than the predetermined distance threshold, the operation determination unit 33 does not detect a crossing position. The operation determination unit 33 then determines that the driver is operating the portable device 11, in the case that the angle formed between the driver's looking direction and the normal direction of the operation screen of the portable device 11 is within the predetermined angle range and that the crossing position is inside the operable space. Information for identifying the operable space may be prestored in the memory 22.

When it is determined that the driver is operating the portable device 11, the operation determination unit 33 notifies the warning processing unit 34 of the result of determination.

Upon receiving the result of determination that the driver is operating the portable device 11 from the operation determination unit 33, the warning processing unit 34 executes a predetermined warning process. For example, the warning processing unit 34 causes the speaker included in the notification device 4 to make a warning sound or a voice signal of a request for stopping operating the portable device 11. Alternatively, the warning processing unit 34 causes the display included in the notification device 4 to display a warning message of a request for stopping operating the portable device 11.

Even after a predetermined period since the driver is warned with the notification device 4 to stop operating the portable device 11, the warning processing unit 34 may continuously receive the result of determination that the driver is operating the portable device 11 from the operation determination unit 33. In such a case, the warning processing unit 34 may control components of the vehicle 10 so that the vehicle 10 makes an emergency stop.

Figure 5:
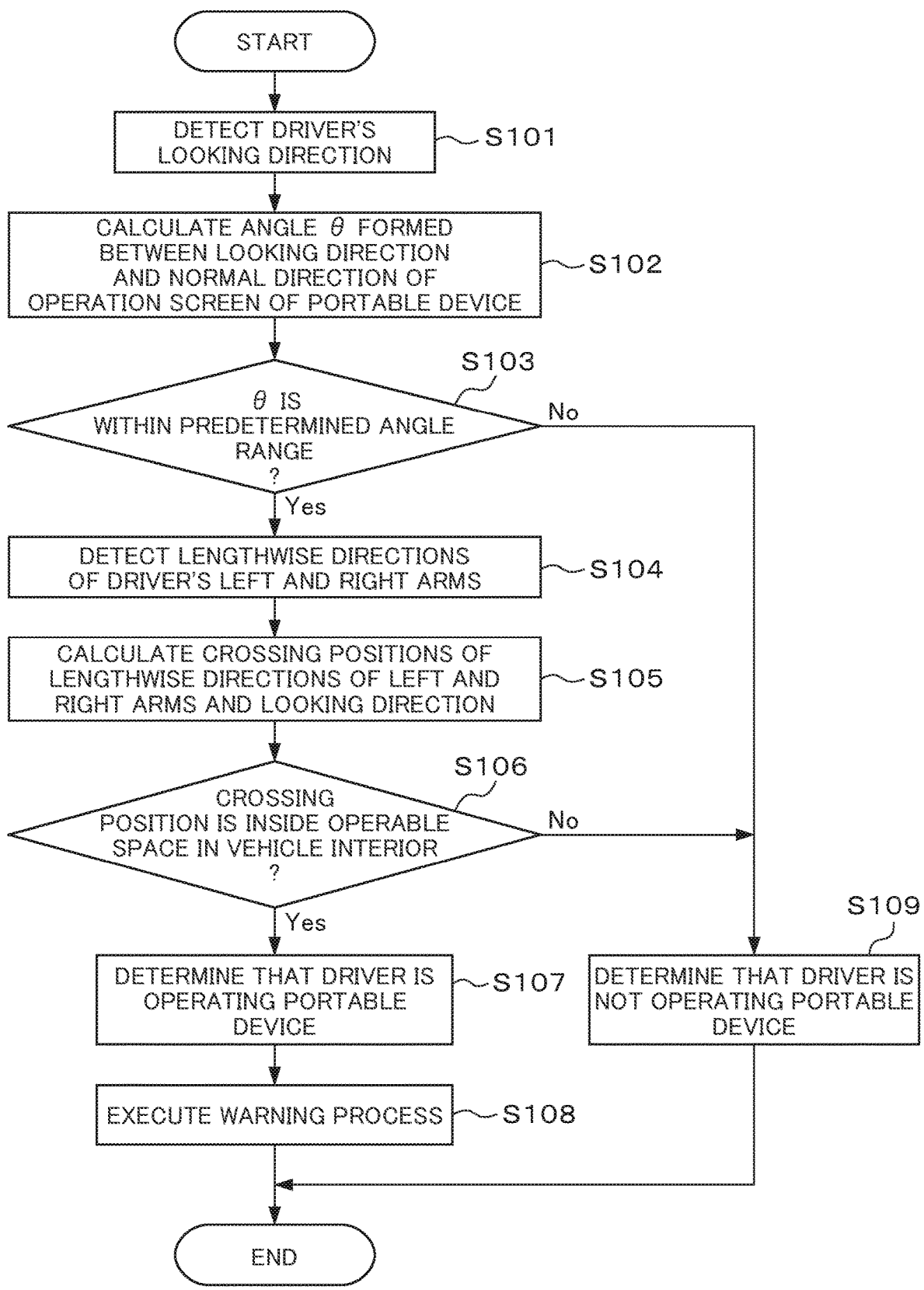
FIG. 5 is an operation flowchart of the driver's behavior determination process executed by the processor of the ECU of a vehicle.

FIG. 5 is an operation flowchart of the driver's behavior determination process executed by the processor 23. The processor 23 executes the driver's behavior determination process in accordance with this operation flowchart at predetermined intervals.

The looking direction detection unit 31 of the processor 23 detects the driver's looking direction, based on a driver image (step S101).

The operation determination unit 33 of the processor 23 calculates an angle θ formed between the driver's looking direction and the normal direction of the operation screen of the portable device 11 included in information received from the portable device 11 via the communication device 2 (step S102). The operation determination unit 33 then determines whether the angle θ is within the predetermined angle range (step S103).

When the angle θ formed between the driver's looking direction and the normal direction of the operation screen of the portable device 11 is within the predetermined angle range (Yes in step S103), the arm direction detection unit 32 of the processor 23 detects the lengthwise directions of the driver's left and right arms (step S104). The operation determination unit 33 calculates the positions at which the lengthwise directions of the driver's left and right arms and the driver's looking direction cross (step S105). The operation determination unit 33 then determines whether the position at which the lengthwise direction of the driver's left or right arm and the driver's looking direction cross is inside a space in the interior of the vehicle 10 where the portable device 11 is operable (step S106).

When the crossing position of the driver's left or right arm is inside the operable space (Yes in step S106), the operation determination unit 33 determines that the driver is operating the portable device (step S107). The warning processing unit 34 of the processor 23 then executes a predetermined warning process with the notification device 4 (step S108).

When the angle θ formed between the driver's looking direction and the normal direction of the operation screen of the portable device 11 is outside the predetermined angle range in step S103 (No in step S103), the operation determination unit 33 determines that the driver is not operating the portable device (step S109). When the crossing positions of the driver's left and right arms are outside the operable space in step S106 (No in step S106), the operation determination unit 33 also determines that the driver is not operating the portable device (step S109).

After step S108 or S109, the processor 23 terminates the driver's behavior determination process.

As has been described above, the apparatus for determining a driver's behavior determines whether a driver is operating a portable device, based on whether an angle formed between the driver's looking direction and the normal direction of the operation screen of the portable device is within a predetermined angle range. For this reason, the apparatus can determine whether the driver is operating the portable device even if the portable device is not represented in images generated by the driver monitoring camera. Additionally, the apparatus determines that the driver is operating the portable device only when the crossing position of the driver's looking direction and the lengthwise direction of the driver's left or right arm is inside a space in the vehicle interior where the driver can operate the portable device. This enables the apparatus to determine whether the driver is operating the portable device more correctly.

According to a modified example, the operation determination unit 33 may determine that the driver is operating the portable device 11 regardless of the lengthwise direction of the driver's arm, when the angle formed between the driver's looking direction and the normal direction of the operation screen of the portable device 11 is within the predetermined angle range. In this case, the arm direction detection unit 32 and the processing of steps S104 to S106 in the operation flowchart illustrated in FIG. 5 may be omitted. Thus, according to this modified example, the apparatus for determining a driver's behavior can determine whether the driver is operating the portable device, with a smaller amount of computation.

In the embodiment or modified example, the operation determination unit 33 may be configured not to determine that the driver is operating the portable device 11 when the driver's looking direction is within a predetermined front area centered in a travel direction of the vehicle 10. Information indicating the predetermined front area may be prestored in the memory 22. According to this modified example, the apparatus for determining a driver's behavior can prevent erroneous determination that the driver watching in the travel direction of the vehicle 10 is operating a portable device for the case that the normal direction of the operation screen of the portable device is substantially parallel to the travel direction of the vehicle.

According to another modified example, the looking direction detection unit 31 may detect the driver's face orientation as well as the driver's looking direction from a driver image. The operation determination unit 33 may then determine that the driver is operating the portable device when angles formed between the driver's looking direction and the normal direction of the operation screen of the portable device 11 and between the driver's face orientation and the normal direction are within a predetermined angle range.

In this case, the looking direction detection unit 31 detects multiple characteristic points of the driver's face, such as the inner and outer canthi, the tip of the nose, and the corners of the mouth, from the face region of the driver image. To this end, the looking direction detection unit 31 detects the characteristic points, for example, by inputting the face region into a classifier that has been trained to detect characteristic points of a face represented in an image. As such a classifier, the looking direction detection unit 31 may use, for example, a DNN having a CNN architecture, a support vector machine, or an AdaBoost classifier. Alternatively, the looking direction detection unit 31 may detect the characteristic points of the driver's face from the face region by template matching of the face region with templates representing the characteristic points of a face or in accordance with another technique to detect characteristic points of a face. The looking direction detection unit 31 fits the detected characteristic points of the face into a three-dimensional facial model representing the three-dimensional shape of a face, and detects the orientation of the face of the three-dimensional facial model best fitted by the characteristic points as the driver's face orientation. The looking direction detection unit 31 may detect the driver's face orientation, based on the driver image, in accordance with another technique to determine the orientation of a face represented in an image.

According to this modified example, the apparatus for determining a driver's behavior can determine whether the driver is operating the portable device more accurately because the determination is made in view of the driver's face orientation as well as the driver's looking direction.

According to still another modified example, the warning processing unit 34 may be configured not to execute the warning process while the vehicle 10 is stopped even if the result of determination that the driver is operating the portable device 11 is received. The warning processing unit 34 receives a measured value of the speed of the vehicle 10 from a vehicle speed sensor (not illustrated) provided for the vehicle 10, and determines whether the vehicle 10 is stopped, based on the measured value.

The computer program for achieving the functions of the processor 23 of the ECU 5 according to the embodiment or modified examples may be provided in a form recorded on a computer-readable and portable medium, such as a semiconductor memory, a magnetic medium, or an optical medium.

As described above, those skilled in the art may make various modifications according to embodiments within the scope of the present invention.

What is claimed is:

1. An apparatus for determining a driver's behavior, comprising:
    a processor configured to:
        detect a looking direction of a driver of a vehicle, based on an image obtained by a camera provided to capture the interior of the vehicle,
        calculate an angle formed between the looking direction and a normal direction of an operation screen of a portable device in the vehicle, the normal direction being indicated by information received from the portable device via a communication device capable of communicating with the portable device, and
        determine that the driver is operating the portable device when the angle is within a predetermined angle range.

2. The apparatus according to claim 1, wherein the processor is further configured to detect a lengthwise direction of one of the driver's arms, based on the image, wherein
    the processor determines that the driver is operating the portable device only when the position at which the lengthwise direction and the looking direction cross is inside a space in the interior of the vehicle where the portable device is operable.

3. The apparatus according to claim 1, wherein the processor does not determine that the driver is operating the portable device when the looking direction is within a predetermined front area centered in a travel direction of the vehicle.

4. A method for determining a driver's behavior, comprising:
    receiving information indicating a normal direction of an operation screen of a portable device in a vehicle from the portable device via a communication device capable of communicating with the portable device;
    detecting a looking direction of a driver of the vehicle, based on an image obtained by a camera provided to capture the interior of the vehicle;

calculating an angle formed between the looking direction and the normal direction of the operation screen of the portable device; and determining that the driver is operating the portable device when the angle is within a predetermined angle range.

5. A non-transitory recording medium that stores a computer program for determining a driver's behavior, the computer program causing a processor mounted on a vehicle to execute a process comprising:

receiving information indicating a normal direction of an operation screen of a portable device in the vehicle from the portable device via a communication device capable of communicating with the portable device;

detecting a looking direction of a driver of the vehicle, based on an image obtained by a camera provided to capture the interior of the vehicle;

calculating an angle formed between the looking direction and the normal direction of the operation screen of the portable device; and determining that the driver is operating the portable device when the angle is within a predetermined angle range.

* * * * *